United States Patent
Ryan et al.

(10) Patent No.: US 11,324,226 B2
(45) Date of Patent: May 10, 2022

(54) CARCASS CLEANING SYSTEM

(71) Applicant: RS CUTTING EDGE NO3 LTD, Newtownards (GB)

(72) Inventors: Liam Ryan, Belfast (GB); Trevor Kells, Newtownards (GB)

(73) Assignee: RS CUTTING EDGE NO3 LTD

( * ) Notice: Subject to any disclaimer, the term of this patent is extended or adjusted under 35 U.S.C. 154(b) by 812 days.

(21) Appl. No.: 15/776,068

(22) PCT Filed: Oct. 28, 2016

(86) PCT No.: PCT/EP2016/076077
§ 371 (c)(1),
(2) Date: May 14, 2018

(87) PCT Pub. No.: WO2017/080849
PCT Pub. Date: May 18, 2017

(65) Prior Publication Data
US 2020/0245631 A1    Aug. 6, 2020

(30) Foreign Application Priority Data
Nov. 12, 2015   (GB) ..................................... 1520016

(51) Int. Cl.
| | | |
|---|---|---|
| A22B 5/00 | (2006.01) | |
| A22C 17/08 | (2006.01) | |
| A22C 21/00 | (2006.01) | |
| A23B 4/015 | (2006.01) | |
| A23B 4/16 | (2006.01) | |

(Continued)

(52) U.S. Cl.
CPC ............ *A22B 5/0082* (2013.01); *A22C 17/08* (2013.01); *A22C 21/0061* (2013.01); *A23B 4/015* (2013.01); *A23B 4/16* (2013.01); *A23B 4/24* (2013.01); *C02F 1/325* (2013.01); *C02F 1/4618* (2013.01); *C02F 1/4672* (2013.01); *C02F 1/78* (2013.01); *A23V 2002/00* (2013.01);

(Continued)

(58) Field of Classification Search
CPC ...... A22B 5/00; A22B 5/0082; A22C 21/0061
USPC ................................................. 452/173, 198
See application file for complete search history.

(56) References Cited

U.S. PATENT DOCUMENTS

| | | |
|---|---|---|
| 4,849,237 A | 7/1989 | Hurst |
| 6,167,709 B1 | 1/2001 | Caracciolo, Jr. et al. |

(Continued)

FOREIGN PATENT DOCUMENTS

| | | |
|---|---|---|
| JP | HII 89509 A | 4/1999 |
| JP | 2000 233185 A | 8/2000 |

OTHER PUBLICATIONS

International Search Report and Written Opinion dated Dec. 15, 2016.

(Continued)

*Primary Examiner* — Richard T Price, Jr.
(74) *Attorney, Agent, or Firm* — Fresh IP PLC; Clifford D. Hyra; Aubrey Y. Chen

(57) ABSTRACT

A carcass cleaning system. Specifically, a system for cleaning an animal carcass using potable water passed through an offline treatment system and the application of this treated water to the surface of the carcass, for example, by running through a bath or by spraying or nebulisation at or onto the surface of the carcass. The invention finds utility in the fields of butchery and slaughtering of animals in the preparation for sale as meat.

6 Claims, 10 Drawing Sheets

(51) Int. Cl.
*A23B 4/24* (2006.01)
*C02F 1/32* (2006.01)
*C02F 1/461* (2006.01)
*C02F 1/467* (2006.01)
*C02F 1/78* (2006.01)
*C02F 103/22* (2006.01)

(52) U.S. Cl.
CPC ............... *C02F 2001/46185* (2013.01); *C02F 2103/22* (2013.01); *C02F 2303/04* (2013.01)

(56) References Cited

U.S. PATENT DOCUMENTS

| | | | | |
|---|---|---|---|---|
| 6,468,953 | B1* | 10/2002 | Hitchems | A01N 59/00 |
| | | | | 510/218 |
| 6,802,984 | B1* | 10/2004 | Perkins | B01D 17/0214 |
| | | | | 210/754 |
| 6,964,787 | B2* | 11/2005 | Swart | A23B 4/015 |
| | | | | 422/22 |
| 7,901,276 | B2* | 3/2011 | McNaughton | A23B 4/20 |
| | | | | 452/149 |
| 2002/0119743 | A1* | 8/2002 | Hilgren | A23B 4/24 |
| | | | | 452/71 |
| 2003/0094422 | A1* | 5/2003 | Perkins | B01D 21/0012 |
| | | | | 210/764 |
| 2005/0153031 | A1* | 7/2005 | Man | A23B 4/30 |
| | | | | 426/332 |
| 2005/0159324 | A1* | 7/2005 | Man | C11D 3/3902 |
| | | | | 510/218 |
| 2007/0141974 | A1 | 6/2007 | McNaughton et al. | |
| 2007/0269563 | A1* | 11/2007 | Mixon | A01N 59/20 |
| | | | | 426/332 |
| 2008/0171117 | A1* | 7/2008 | Mixon | A61L 2/22 |
| | | | | 426/332 |
| 2008/0213444 | A1* | 9/2008 | Mixon | A23B 4/02 |
| | | | | 426/332 |
| 2009/0324790 | A1* | 12/2009 | Hilgren | A22B 7/008 |
| | | | | 426/335 |

OTHER PUBLICATIONS

Steffen H P et al: User Experiences with Ozone, Electrolytic Water (Active Water) and UV-C Light (Ventafresh Technology) in Production Processes and for Hygiene Maintenance in a Swiss SUSHI Factory11 , Internet Citation, Oct. 31, 2007 (Oct. 31, 2007), pp. 1-12.

* cited by examiner

CARCASS CLEANING SYSTEM

This application claims the benefit of Great Britain Patent Application No. 1520016.5, filed Nov. 12, 2015, which is hereby incorporated by reference in its entirety.

FIELD OF THE DISCLOSURE

The present disclosure relates to a carcass cleaning system. Specifically, the present disclosure relates to a system for cleaning an animal carcass using potable water passed through an offline treatment system and the application of this treated water to the surface of the carcass, for example, by running through a bath or by spraying or nebulisation at or onto the surface of the carcass. The invention finds utility in the fields of butchery and slaughtering of animals in the preparation for sale as meat.

BACKGROUND TO THE INVENTION

Microbes contaminate the majority of animal carcasses sold to consumers through retail chains, with the vast majority of this contamination process happening during the production process. This microbial contamination occurs through the contamination of the animal carcass by faecal matter from the intestine and the associated microflora including *Campylobacter* spp; *Escherichia coli* (*E. coli*) spp; *Salmonella* spp; *Listeria* spp; and *Pseudomonas* spp; as well as other problematic microbes. Currently, these microbes cause the majority of food poisoning cases globally.

At present, the meat and poultry industry apply water at numerous stages in the mistaken belief that the addition of water to the surface of the animal carcass reduces the chances of material drying out on the surface. *Pseudomonas* spp. produce a slime on the surface of the meat, which provides a protective coat for the problematic bacteria. This protective coat of slime makes it is virtually impossible to affect the surface contamination using current technologies.

Further, recent legislation from the European Commission as well as the European Food Safety Authority (EFSA) and United Kingdom Food Standards Agency (FSA) has only allowed the use of potable water to reduce the levels of contamination on meat such as chicken.

A number of drawbacks are associated with the systems and methods of the prior art, in particular microbial spoilage, often resulting from infection by a bacterium such as *Campylobacter*, *Salmonella*, *E. coli*, or *Listeria*, the presence of which is indicative of the high faecal contamination on the surface of the carcass. Moreover, kill lines are so quick, it is incredibly difficult to create a sterile environment in a carcass processing plant and any solution must provide protection throughout the whole process. The current cost to implement a decontamination system and method is 4-50 p/kg of carcass (e.g. chicken) but produces only minimal reduction steps.

Accordingly, there is a need to provide a carcass cleaning system that is suitable for cleaning an animal carcass using potable water.

SUMMARY OF THE INVENTION

According to a first aspect of the present invention, there is provided a system for cleaning a carcass, the system comprising:
(a) a fluid source;
(b) a source of ozone;
(c) a source of radiation; and
(d) a source of disinfectant.

Optionally, the fluid source is a liquid source. Further optionally, the fluid source is a water source. Still further optionally, the fluid source is a potable water source.

Optionally, the fluid source is a fluid reservoir. Further optionally, the fluid source is a liquid reservoir. Still further optionally, the fluid source is a water reservoir. Still further optionally, the fluid source is a potable water reservoir. Still further optionally, the fluid source is a potable water wash or spray bath.

Optionally, the fluid source provides fluid at a rate of 0.2-3.0 m$^3$/hour. Further optionally, the fluid source provides fluid at a rate of 0.2-1.0 m$^3$/hour. Alternatively, the fluid source provides fluid at a rate of 1.0-2.0 m$^3$/hour. Optionally, the fluid source provides fluid at a rate of 2.0-3.0 m$^3$/hour.

Optionally, the system further comprises delivery means for cleaning the carcass.

Optionally, the delivery means comprise a reservoir. Further optionally, the delivery means comprise a reservoir comprising the fluid of the present invention. Still further optionally, the delivery means comprise a reservoir comprising the fluid of the present invention, and into which a carcass can be immersed, optionally temporarily immersed.

Optionally, the delivery means comprise an actuator. Further optionally, the delivery means comprise a hose or pipe. Still further optionally, the delivery means comprise a spray.

Optionally, the fluid source; the source of ozone; the source of radiation; and the source of disinfectant are in fluid communication.

Optionally, the fluid source and the delivery means are in fluid communication. Further optionally, the fluid source, the source of radiation, and the delivery means are in fluid communication. Still further optionally, the fluid source, the source of ozone, the source of radiation, and the delivery means are in fluid communication. Still further optionally, the fluid source, the source of ozone, the source of radiation, the source of disinfectant, and the delivery means are in fluid communication.

Optionally, the source of ozone is an ozone generator. Further optionally, the source of ozone is a medical or food grade ozone generator.

Optionally, the ozone generator further comprises a source of fluid. Further optionally, the ozone generator further comprises a source of gas.

Optionally, the ozone generator further comprises a source of air. Optionally, the source of air is an air pump for pumping ambient air.

Optionally, the source of air provides air at a rate of up to 20 L/min. Further optionally, the source of air provides air at a rate of 5-20 L/min. Still further optionally, the source of air provides air at a rate of 10-20 L/min. Still further optionally, the source of air provides air at a rate of 15-20 L/min. Still further optionally, the source of air provides air at a rate of 17-20 L/min.

Further optionally, the ozone generator further comprises a source of oxygen. Optionally, the source of oxygen is an oxygen concentrator. Optionally, the source of oxygen is a rapid pressure swing adsorption oxygen concentrator. Alternatively, the source of oxygen is a vacuum swing adsorption oxygen concentrator.

Optionally, the source of oxygen provides oxygen at a rate of up to 20 L/min. Further optionally, the source of oxygen provides oxygen at a rate of 5-20 L/min. Still further optionally, the source of oxygen provides oxygen at a rate of 10-20 L/min. Still further optionally, the source of oxygen provides oxygen at a rate of 15-20 L/min. Still further optionally, the source of oxygen provides oxygen at a rate of 17-20 L/min.

Optionally, the ozone generator comprises a corona discharge tube. Further optionally, the ozone generator comprises a corona discharge tube having an electrode. Still further optionally, the ozone generator comprises a corona discharge tube having a discharge electrode. Still further optionally, the ozone generator comprises a corona discharge tube having a discharge electrode with a negative electrode potential.

Optionally the ozone generator uses a high voltage generator to generate a corona effect, which causes the production or singlet oxygen and then ozone.

Optionally, the ozone generator comprises a high voltage corona discharge tube. Further optionally, the ozone generator comprises a high voltage corona discharge tube having an electrode. Still further optionally, the ozone generator comprises a high voltage corona discharge tube having a discharge electrode. Still further optionally, the ozone generator comprises a high voltage corona discharge tube having a discharge electrode with a negative electrode potential.

Optionally, the ozone generator comprises a high voltage ceramic corona discharge tube. Further optionally, the ozone generator comprises a high voltage ceramic corona discharge tube having an electrode. Still further optionally, the ozone generator comprises a high voltage ceramic corona discharge tube having a discharge electrode. Still further optionally, the ozone generator comprises a high voltage ceramic corona discharge tube having a discharge electrode with a negative electrode potential.

Optionally or additionally, the ozone generator generates up to 8 g/hour of ozone. Further optionally or additionally, the ozone generator generates 3-8 g/hour of ozone. Still further optionally or additionally, the ozone generator generates 5-8 g/hour of ozone. Still further optionally or additionally, the ozone generator generates 6-8 g/hour of ozone. Still further optionally or additionally, the ozone generator generates 8 g/hour of ozone.

Alternatively, the ozone generator comprises a source of ultraviolet radiation. Alternatively, the ozone generator comprises a source of ultraviolet radiation. Optionally, the source of ultraviolet radiation is selected from an arc lamp or gas discharge lamp, a tanning lamp, a filtered lamp, a fluorescent/phosphor lamp, and a light-emitting diode. Further optionally, the source of ultraviolet radiation is selected from a mercury-vapour lamp, a tanning lamp, and a black light.

Optionally, the source of radiation is a source of electromagnetic radiation. Further optionally, the radiation is a source of electromagnetic radiation having a wavelength of 400 nm to 100 nm. Still further optionally, the radiation is a source of ultraviolet radiation.

Further optionally, the radiation is a source of electromagnetic radiation having a wavelength of 315 nm to 254 nm. Still further optionally, the radiation is a source of UVB radiation.

Optionally, the source of ultraviolet radiation is selected from an arc lamp or gas discharge lamp, a tanning lamp, a filtered lamp, a fluorescent/phosphor lamp, and a light-emitting diode. Further optionally, the source of ultraviolet radiation is selected from a mercury-vapour lamp, a tanning lamp, and a black light.

Optionally, the source of disinfectant further comprises a liquid source. Further optionally, the source of disinfectant further comprises a water source. Still further optionally, the source of disinfectant further comprises a potable water source.

Alternatively, the source of disinfectant further comprises a water source, wherein the water comprises salt. Further alternatively, the source of disinfectant further comprises a water source, wherein the water comprises sodium chloride. Further alternatively, the source of disinfectant further comprises a water source, wherein the water comprises dissolved sodium chloride.

Alternatively, the source of disinfectant further comprises an electrolysed water source.

Further optionally, the source of disinfectant further comprises a water source and means for splitting the water. Still further optionally, the source of disinfectant further comprises a potable water source and means for splitting the potable water.

Optionally, the water splitting means comprise a photocatalyst. Further optionally, the water splitting means comprise a metal. Still further optionally, the water splitting means comprise a metal selected from silver, gold, platinum, palladium, titanium, or an alloy each thereof, or a mixture each thereof, optionally a steel alloy. Still further optionally, the water splitting means comprise palladium or an alloy thereof, or a mixture each thereof, optionally stainless steel.

Optionally, the water splitting means comprise a titanium plate. Further optionally, the water splitting means comprise a titanium and platinum plate.

Optionally, the water splitting means comprise a palladium plate. Further optionally, the water splitting means comprise an electrified palladium plate. Still further optionally, the water splitting means comprise a multiple membrane electrified palladium plate.

Optionally the electrified palladium plate combined with a multiple membrane acts on the mineral portion of the water helping to maintain the potability of the water.

Optionally, the water splitting means comprise more than one plate.

Optionally the electrified palladium plate combined with a multiple membrane acts on the mineral portion of the water helping to remove contamination from the surface of the carcass.

Optionally, the system comprises: (a) a fluid source; (b) a source of ozone; (c) a source of radiation; and (d) a source of disinfectant; arranged in any order or arrangement.

Alternatively, the system comprises the sequential arrangement of (a) a fluid source; (b) a source of ozone; (c) a source of radiation; and (d) a source of disinfectant.

Further alternatively, the system comprises the sequential arrangement of (d) a source of disinfectant; and (a) a fluid source, (b) a source of ozone, or (c) a source of radiation arranged in any order or arrangement.

Further alternatively, the system comprises the sequential arrangement of (a) a fluid source and (d) a source of disinfectant; and (b) a source of ozone or (c) a source of radiation arranged in any order or arrangement.

Still further alternatively, the system comprises the sequential arrangement of (d) a source of disinfectant; (a) a fluid source; (b) a source of ozone; and (c) a source of radiation.

Optionally, the carcass is an animal carcass.

Optionally, the carcass is the carcass of a livestock animal. Further optionally, the carcass is the carcass of an animal selected from poultry and ungulates. Still further optionally, the carcass is the carcass of an animal selected from poultry, bovines, suids (pigs), and ovines (sheep or goats).

Optionally, the carcass is a whole carcass. Alternatively, the carcass is part of a whole carcass.

According to a second aspect of the present invention, there is provided a method for cleaning a carcass, the method comprising the steps of:
(a) providing a fluid source;
(b) providing a source of ozone to or at the fluid source;
(c) providing a source of radiation to or at the fluid source;
(d) providing a source of disinfectant to or at the fluid source; and
(e) cleaning a carcass with the fluid.

Optionally, the method comprises the steps of (a) providing a fluid source; (b) providing a source of ozone to or at the fluid source, (c) providing a source of radiation to or at the fluid source, or (d) providing a source of disinfectant to or at the fluid source, in any order; and (e) cleaning a carcass with the fluid.

Alternatively, the method comprises the sequential steps of (a) providing a fluid source; (b) providing a source of ozone to or at the fluid source; (c) providing a source of radiation to or at the fluid source; (d) providing a source of disinfectant to or at the fluid source; and (e) cleaning a carcass with the fluid.

Further alternatively, the method comprises the sequential steps of (a) providing a fluid source; (d) providing a source of disinfectant to or at the fluid source; (b) providing a source of ozone to or at the fluid source, or (c) providing a source of radiation to or at the fluid source, in any order; and (e) cleaning a carcass with the fluid.

Optionally, the cleaning step comprises delivering the fluid to the carcass. Optionally, the cleaning step comprises immersing, optionally temporarily immersing, the carcass in a reservoir comprising the fluid. Alternatively, the cleaning step comprises spraying the fluid onto the carcass. Further alternatively, the cleaning step comprises a combination of delivering the fluid to the carcass and spraying the fluid onto the carcass.

According to a third aspect of the present invention, there is provided a method for reducing infection of a carcass, the method comprising the steps of:
(a) providing a fluid source;
(b) providing a source of ozone to or at the fluid source;
(c) providing a source of radiation to or at the fluid source;
(d) providing a source of disinfectant to or at the fluid source; and
(e) cleaning a carcass with the fluid.

Optionally, the infection is a bacterial infection.

Optionally, the infection is an infection of a bacterium selected from at least one of *Campylobacter* spp; *Escherichia coli* (*E. coli*) spp; *Salmonella* spp; *Listeria* spp; and *Pseudomonas* spp.

Optionally, the method comprises the steps of (a) providing a fluid source; (b) providing a source of ozone to or at the fluid source, (c) providing a source of radiation to or at the fluid source, or (d) providing a source of disinfectant to or at the fluid source, in any order; and (e) cleaning a carcass with the fluid.

Alternatively, the method comprises the sequential steps of (a) providing a fluid source; (b) providing a source of ozone to or at the fluid source; (c) providing a source of radiation to or at the fluid source; (d) providing a source of disinfectant to or at the fluid source; and (e) cleaning a carcass with the fluid.

Further alternatively, the method comprises the sequential steps of (a) providing a fluid source; (d) providing a source of disinfectant to or at the fluid source; (b) providing a source of ozone to or at the fluid source, or (c) providing a source of radiation to or at the fluid source, in any order; and (e) cleaning a carcass with the fluid.

Optionally, the cleaning step comprises delivering the fluid to the carcass. Optionally, the cleaning step comprises immersing, optionally temporarily immersing, the carcass in a reservoir comprising the fluid. Alternatively, the cleaning step comprises spraying the fluid onto the carcass. Further alternatively, the cleaning step comprises a combination of delivering the fluid to the carcass and spraying the fluid onto the carcass.

Accordingly, embodiments of the present invention provide a system and methods for cleaning an animal carcass, and which cleans the water with which the animal carcass is to be cleaned, thereby ensuring bacteria are removed. The present invention in embodiments also slightly changes the charge of the water allowing bacteria, problematic *Pseudomonas* slime, and/or faecal matter to be removed. The invention in embodiments also results in removal of excess bacteria that may not have been removed by filtration from the meat, for example chicken, surface, thereby circumventing the problem resulting from the attraction between bacterial cells being greater than between bacteria cell walls and animal skin. The system of the present invention can be used in embodiments in combination with currently used spray bath systems, which will provide vigorous washing and so help with the removal of bacteria and faecal matter.

The present invention in embodiments also provides the following added benefits and potential cost savings:
1. the fluid is treated stage by stage throughout the present system and method so there is no heavy loading on the final treatment plant;
2. the present system and method overcomes the problem that water currently used in treatment plants can become contaminated due to the production environment;
3. bio-films are a constant source of worry in the production environment and the chances of bio-film production are reduced by the present system and method; and
4. the present system and method provides means for water currently used in carcass processing plants to meet the potable water standard.

The invention is not limited to the embodiment(s) described herein but can be amended or modified without departing from the scope of the present invention.

BRIEF DESCRIPTION OF THE DRAWINGS

Embodiments of the present invention will now be described with reference to the accompanying drawings, in which.

EXAMPLES

Figure 1:
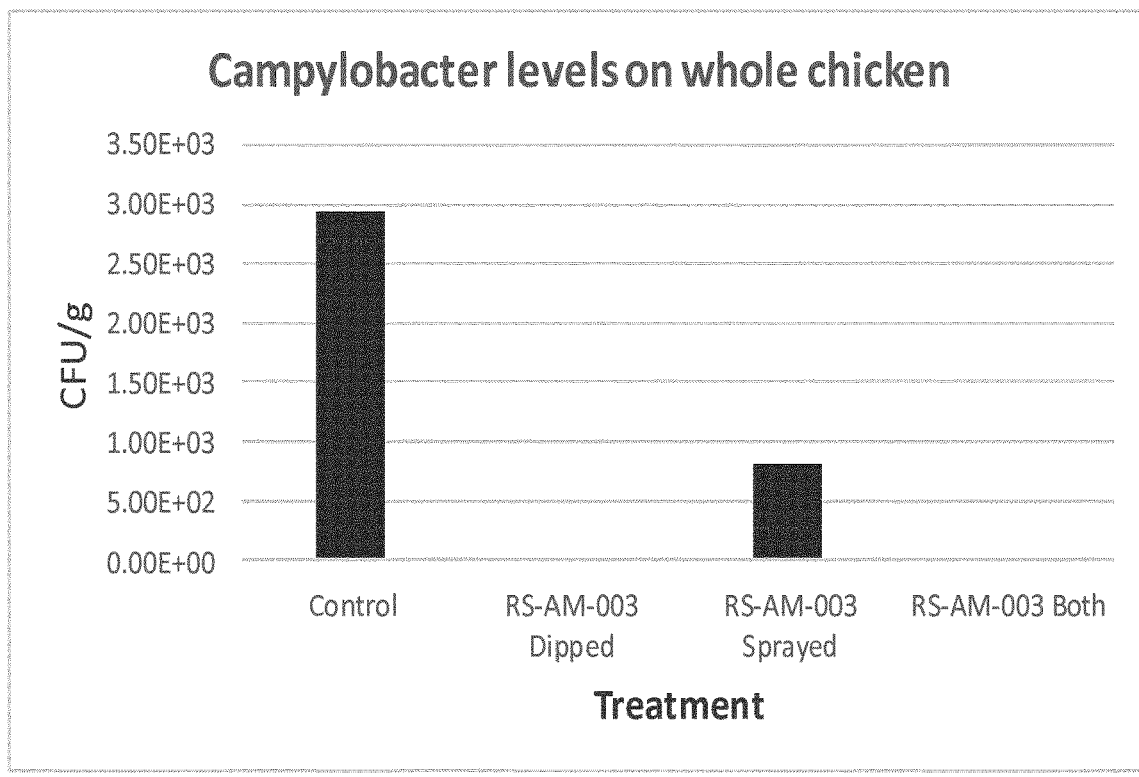
FIG. 1 is a graph illustrating >$10^3$-fold reduction in contamination on whole chicken, and significant reduction ($p<0.05$) in contamination on whole chicken when the cleaning step comprises spraying.
Figure 2:
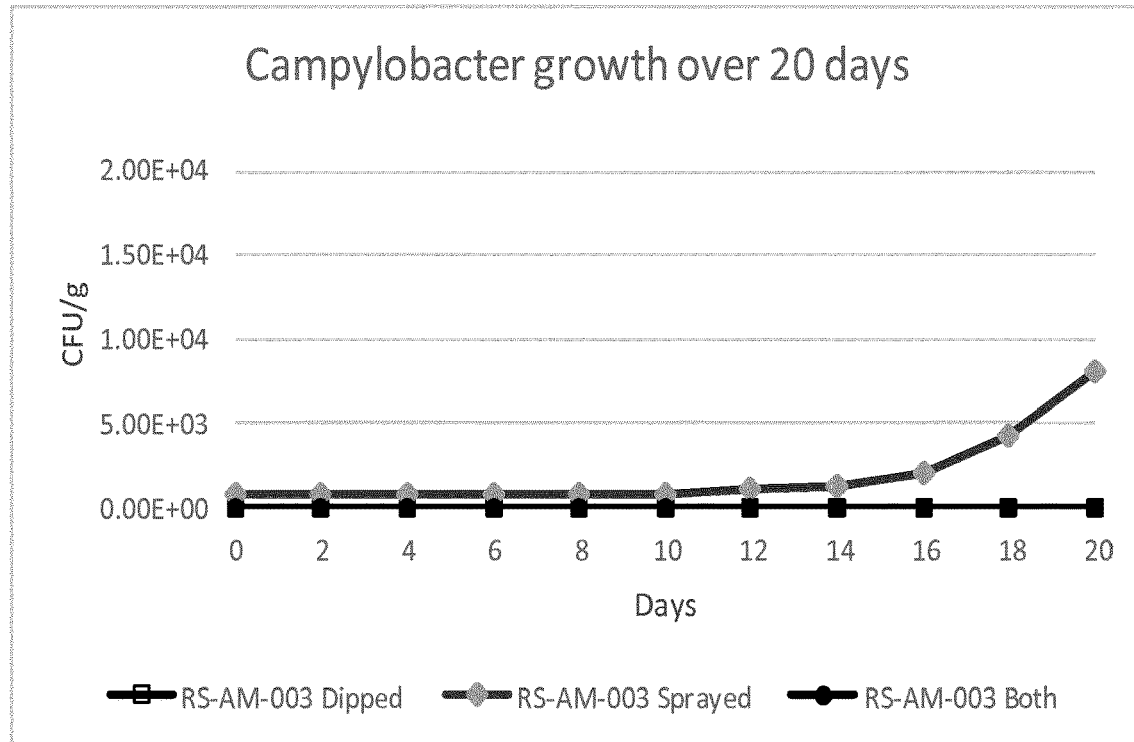
FIG. 2 is a graph in which the control sample was above $10^3$ cfu/g at day 0 and so was excluded, and illustrating no microbial growth was observed over the 20 days life.
Figure 3:
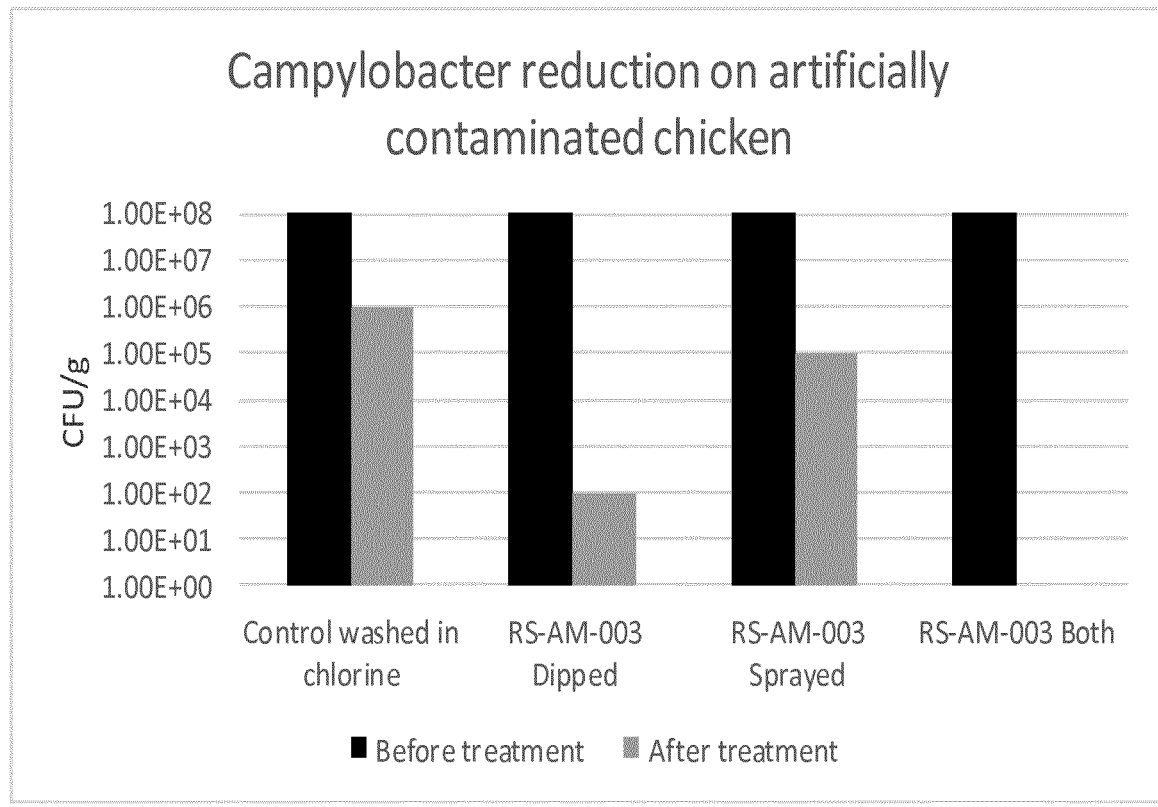
FIG. 3 is a graph illustrating chicken samples that were contaminated with $10^8$ viable *Campylobacter* cells, left to rest for 2 hours and then treated. In this case, the control was treated in 200 ppm chlorine solution for 3 min, and all other treatments are the same as previously described.
Figure 4:
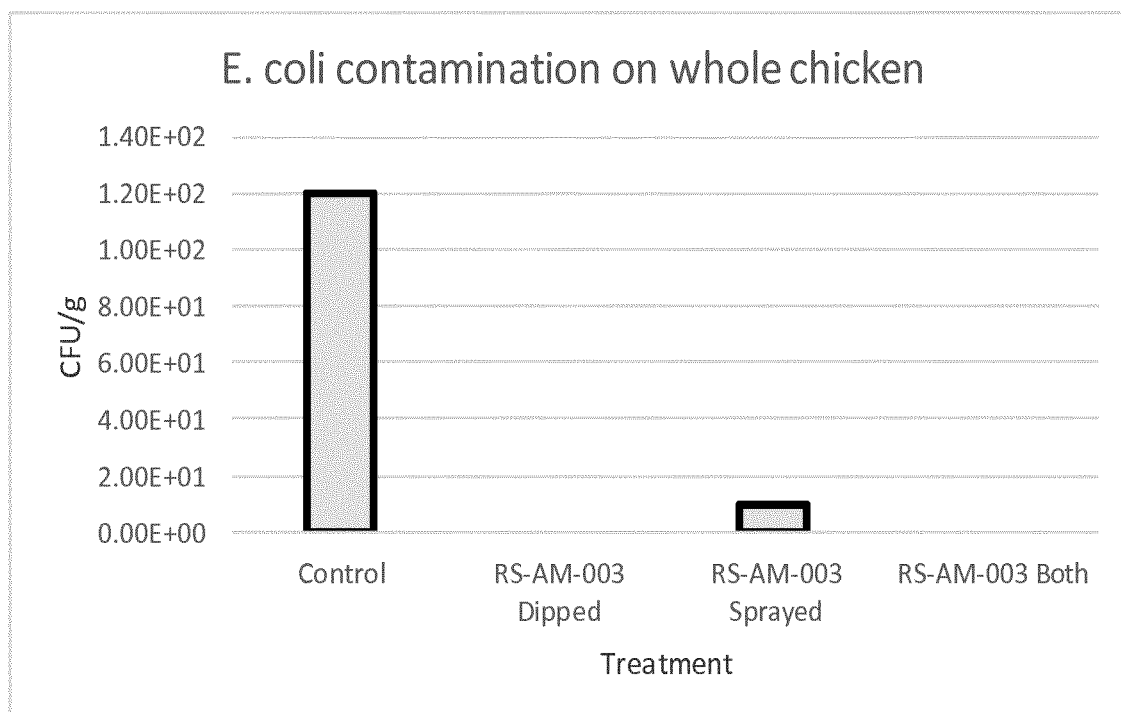
FIG. 4 is a graph illustrating significant reductions ($p<0.05$) in *E. coli* levels after treatment, wherein a minimum 2 log reduction was observed throughout this study.
Figure 5:
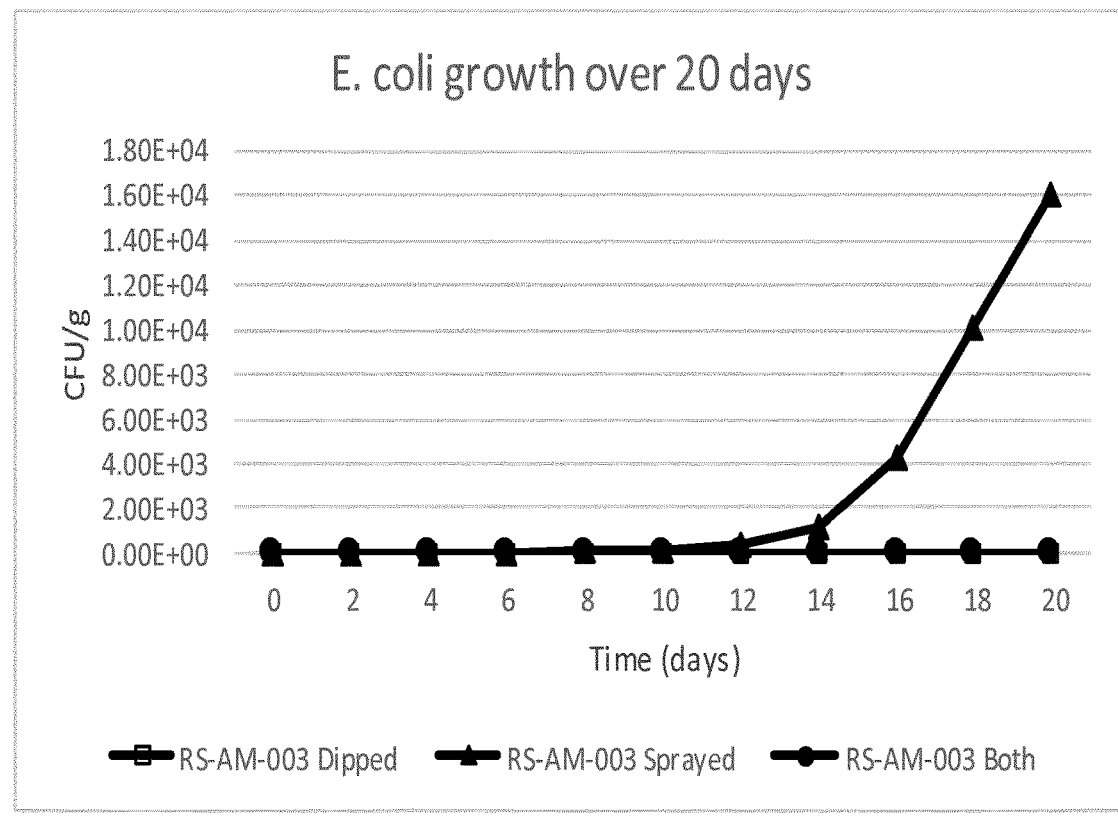
FIG. 5 is a graph in which the control sample was above $10^3$ cfu/g on day 4, and so was excluded, and illustrating no microbial growth was observed over the days life.
Figure 6:
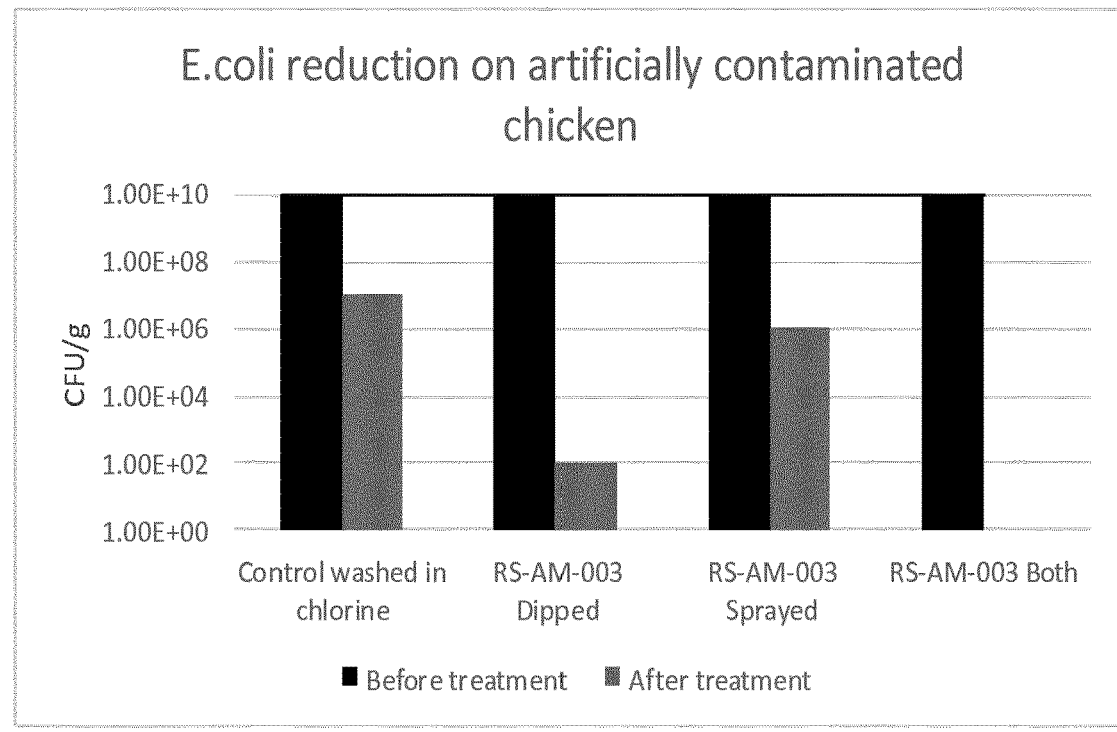
FIG. 6 is a graph illustrating chicken samples that were contaminated with $10^{10}$ viable *E. coli* cells, left to rest for 2 hours and then treated. In this case, the control was treated in 200 ppm chlorine solution for 3 min, and all other treatments are the same as previously described.
Figure 7:
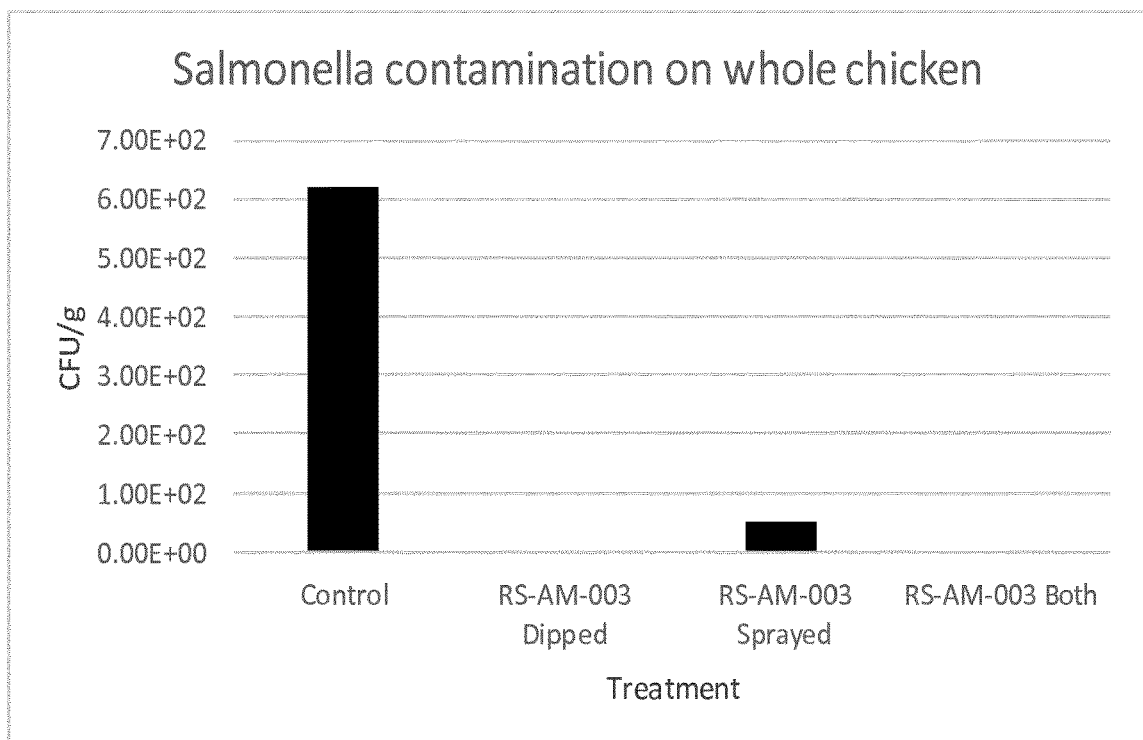
FIG. 7 is a graph illustrating significant reductions ($p<0.05$) in *Salmonella* levels after treatment, wherein a minimum 2 log reduction was observed throughout this study.
Figure 8:
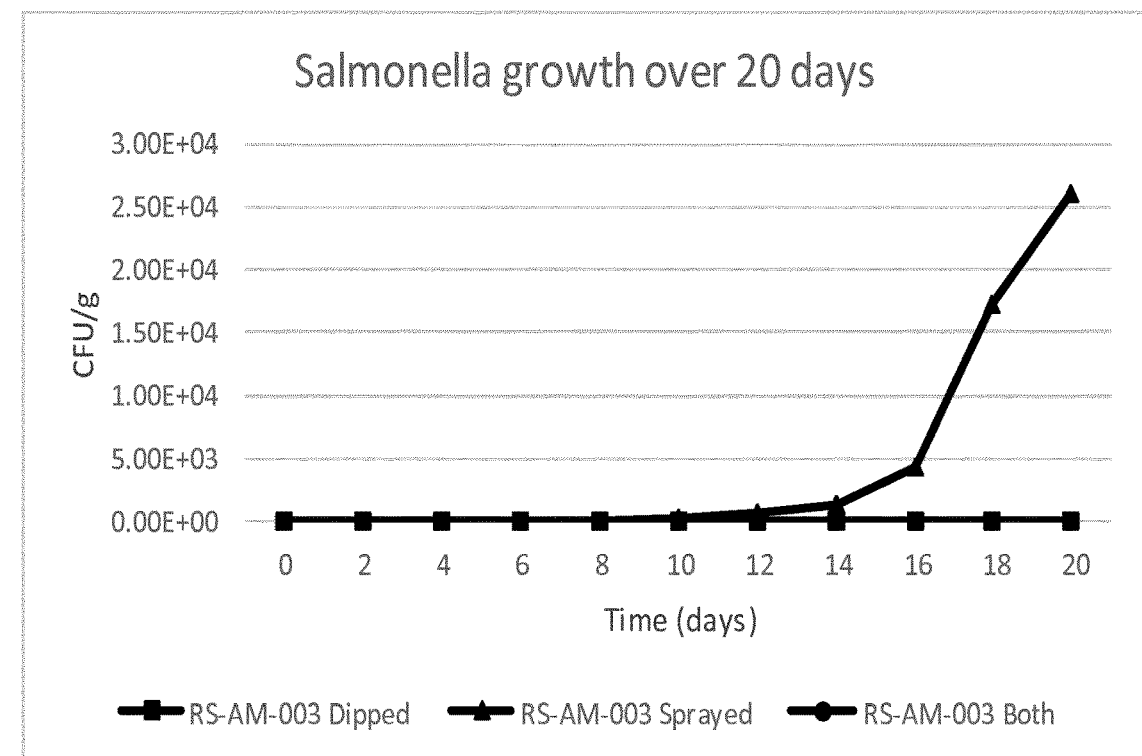
FIG. 8 is a graph in which the control sample was above $10^3$ cfu/g on day 2, and so was excluded, and illustrating no microbial growth was observed over the 20 days life.
Figure 9:
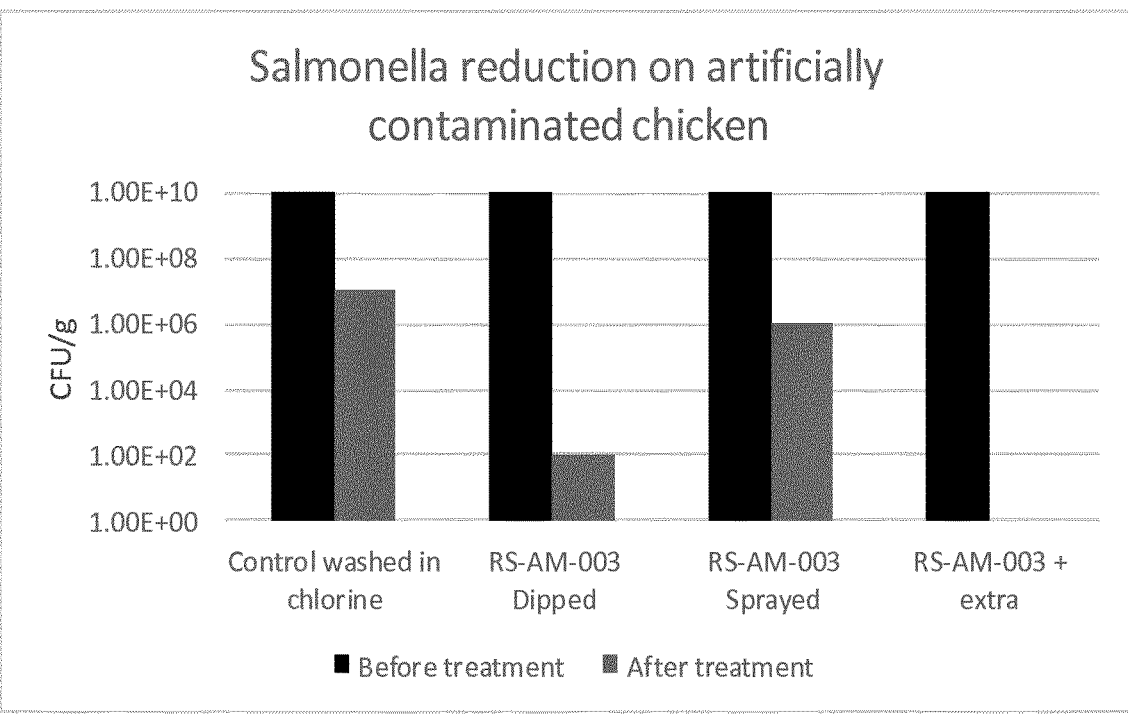
FIG. 9 is a graph illustrating chicken samples that were contaminated with $10^{10}$ viable *Salmonella* cells, left to rest for 2 hours and then treated. In this case, the control was treated in 200 ppm chlorine solution for 3 min, and all other treatments are the same as previously described.
Figure 10:
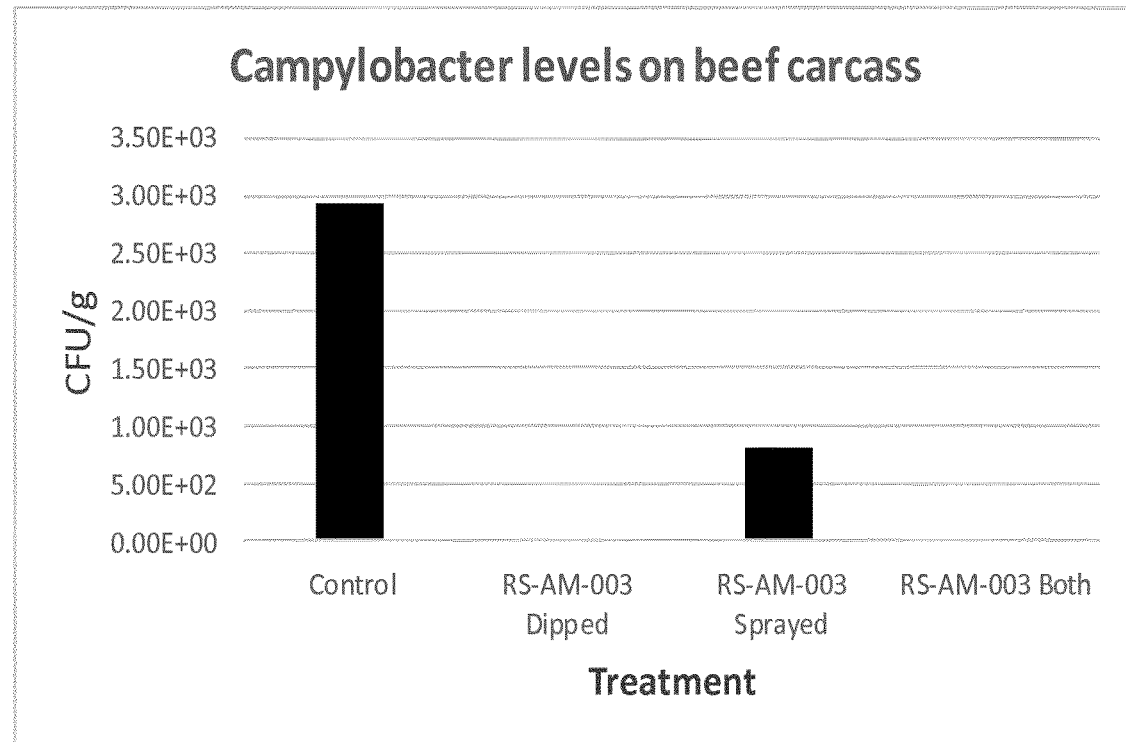
FIG. 10 is a graph illustrating >$10^3$-fold reduction in contamination on whole beef, and significant reduction ($p<0.05$) in contamination on whole chicken when the cleaning step comprises spraying.
Figure 11:
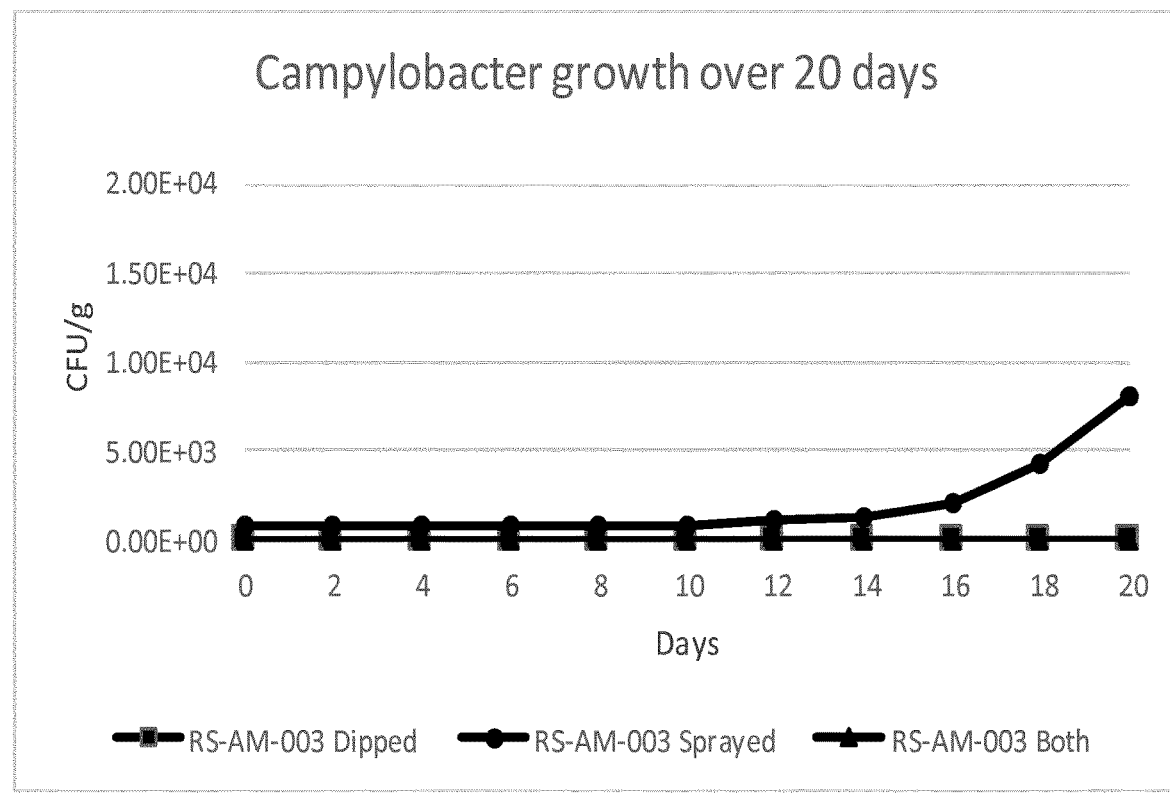
FIG. 11 is a graph in which the control sample was above $10^3$ cfu/g at day 0 and so was excluded, and illustrating no microbial growth was observed over the 20 days life.
Figure 12:
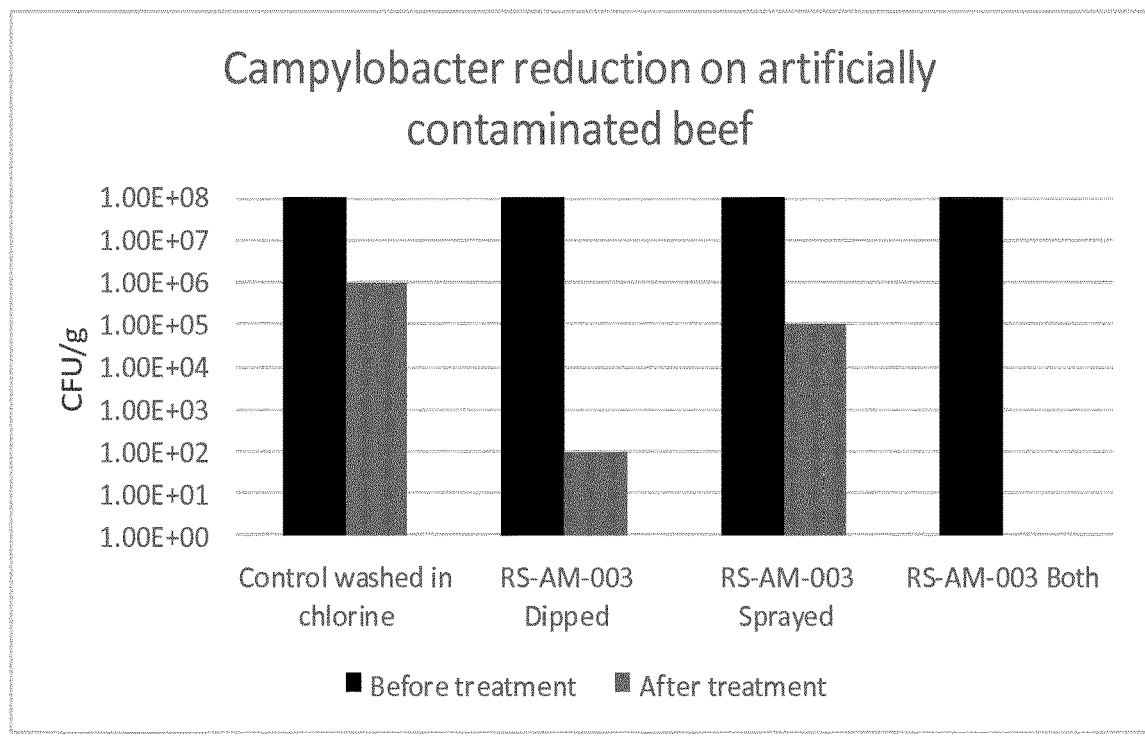
FIG. 12 is a graph illustrating beef samples that were contaminated with $10^8$ viable Campylobacter cells, left to rest for 2 hours and then treated. In this case, the control was treated in 200 ppm chlorine solution for 3 min, and all other treatments are the same as previously described.
Figure 13:
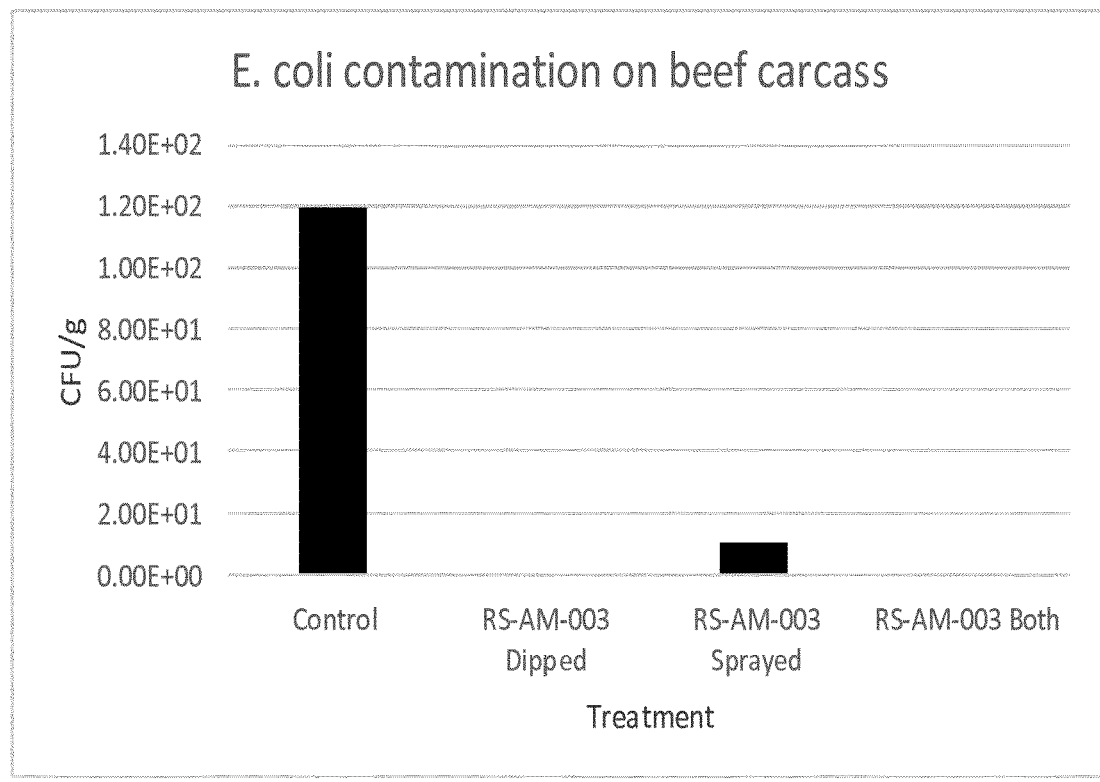
FIG. 13 is a graph illustrating significant reductions ($p<0.05$) in *E.coli* levels after treatment, wherein a minimum 2 log reduction was observed throughout this study.
Figure 14:
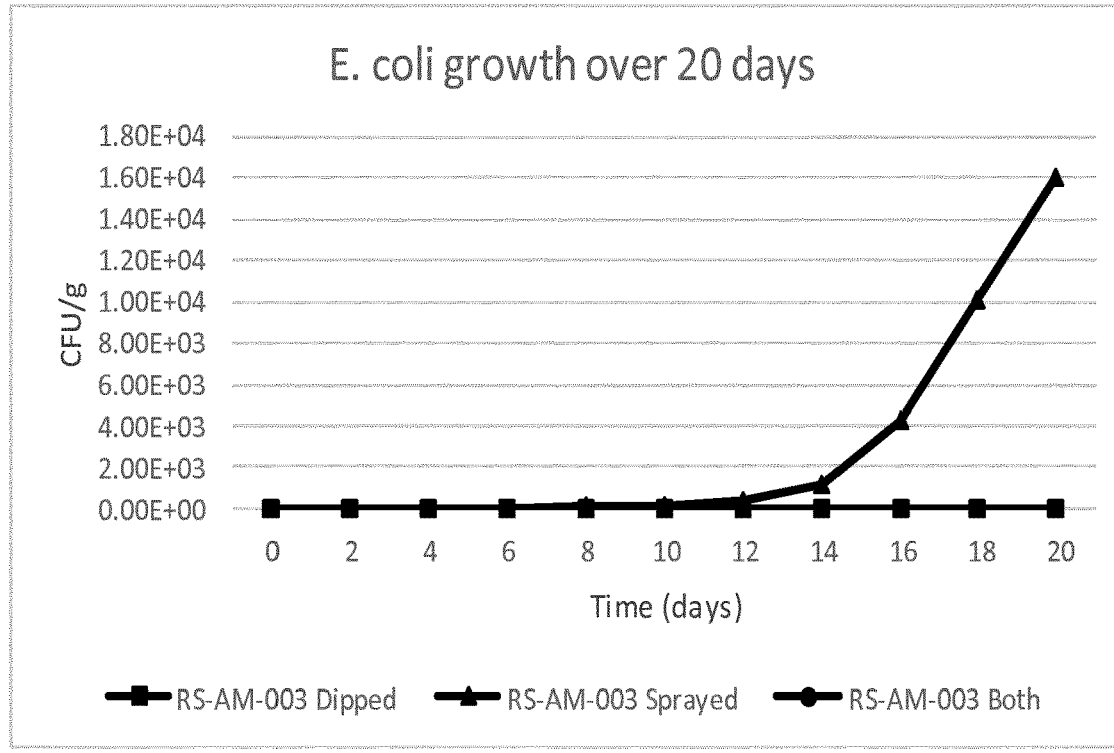
FIG. 14 is a graph in which the control sample was above $10^3$ cfu/g on day 4 and so was excluded, and illustrating no growth was observed over the days life.
Figure 15:
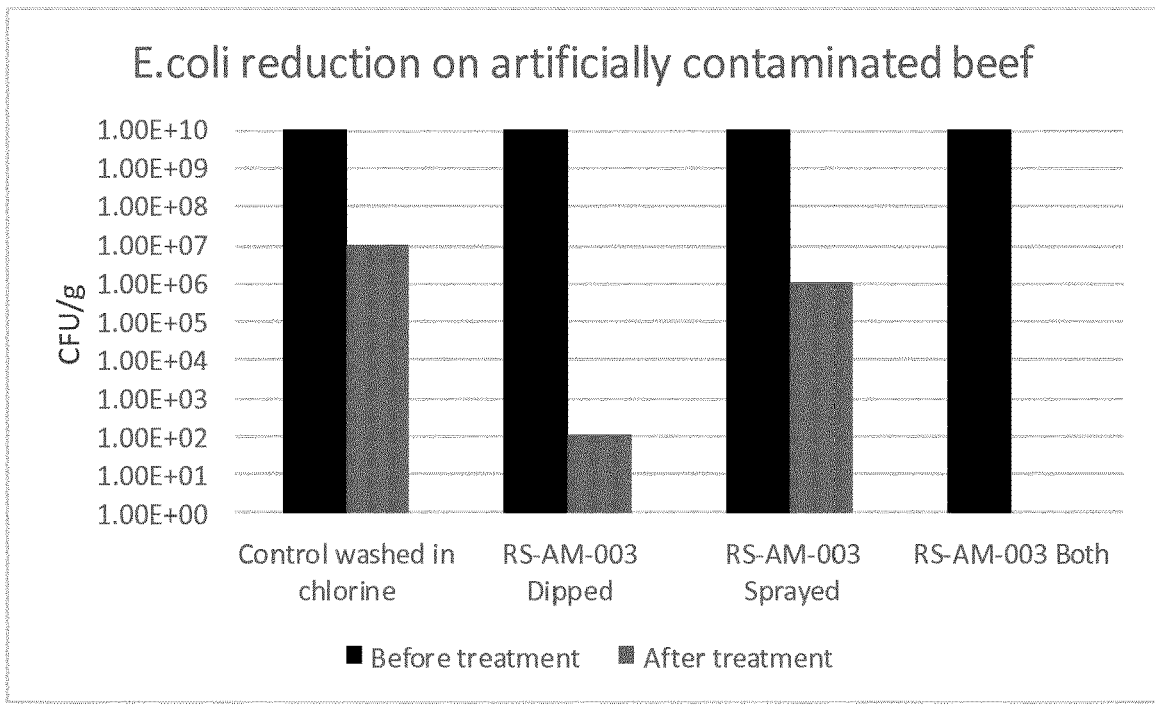
FIG. 15 is a graph illustrating beef samples that were contaminated with $10^{10}$ viable *E. coli* cells, left to rest for 2 hours and then treated. In this case the control was treated in 200 ppm chlorine solution for 3 min, and all other treatments are the same as previously described.
Figure 16:
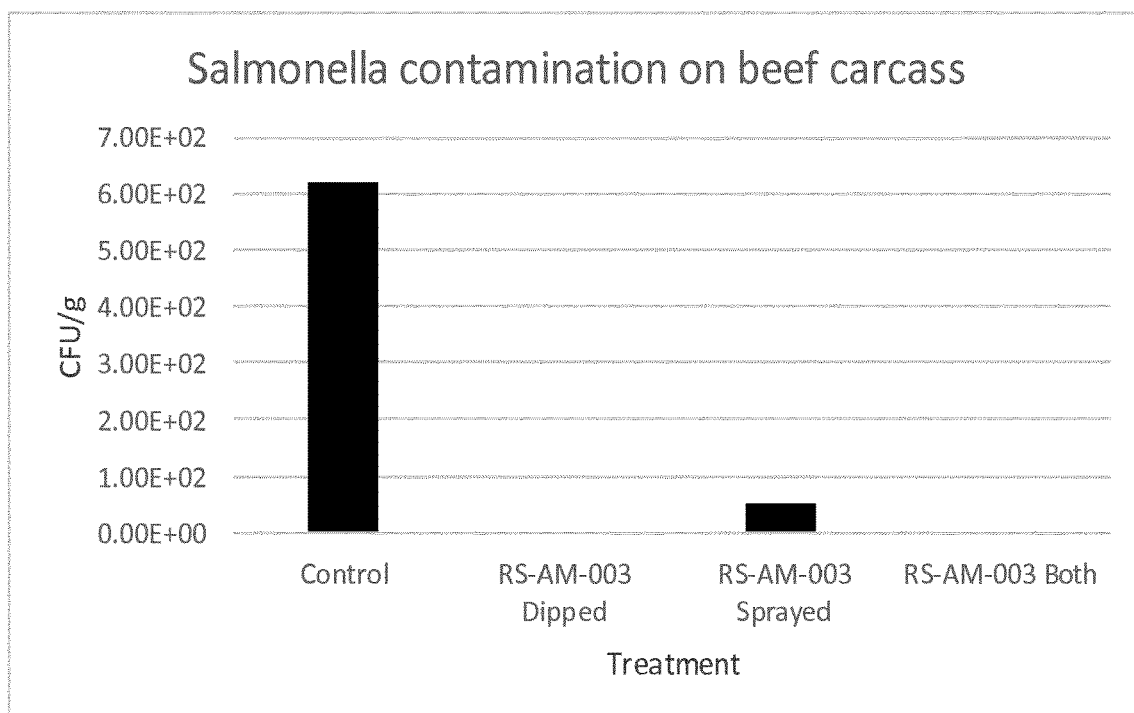
FIG. 16 is a graph illustrating significant reductions ($p<0.05$) in *Salmonella* levels after treatment, wherein a minimum 2 log reduction was observed throughout this study.
Figure 17:
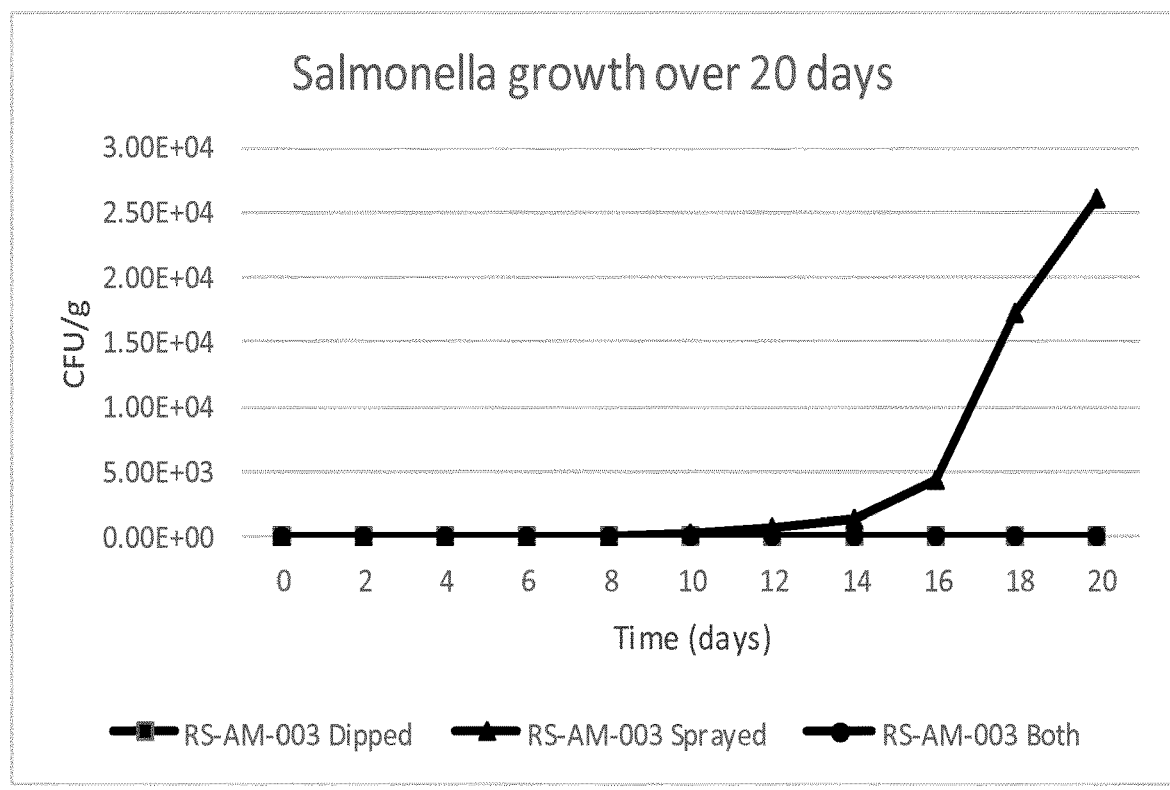
FIG. 17 is a graph in which the control sample was above $10^3$ cfu/g on day 2 and so was excluded, and illustrating no microbial growth was observed over the 20 days life.
Figure 18:
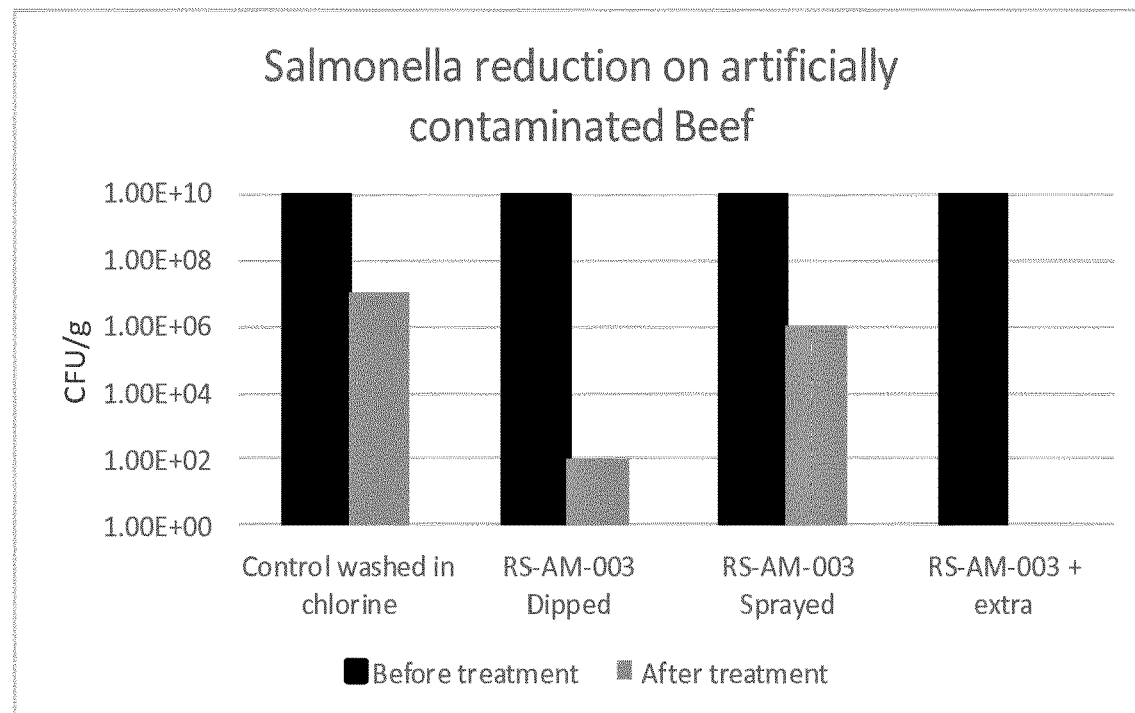
FIG. 18 is a graph illustrating beef samples that were contaminated with $10^{10}$ viable *Salmonella* cells, left to rest for 2 hours and then treated. In this case, the control was treated in 200 ppm chlorine solution for 3 min, and all other treatments are the same as previously described.
Figure 19:
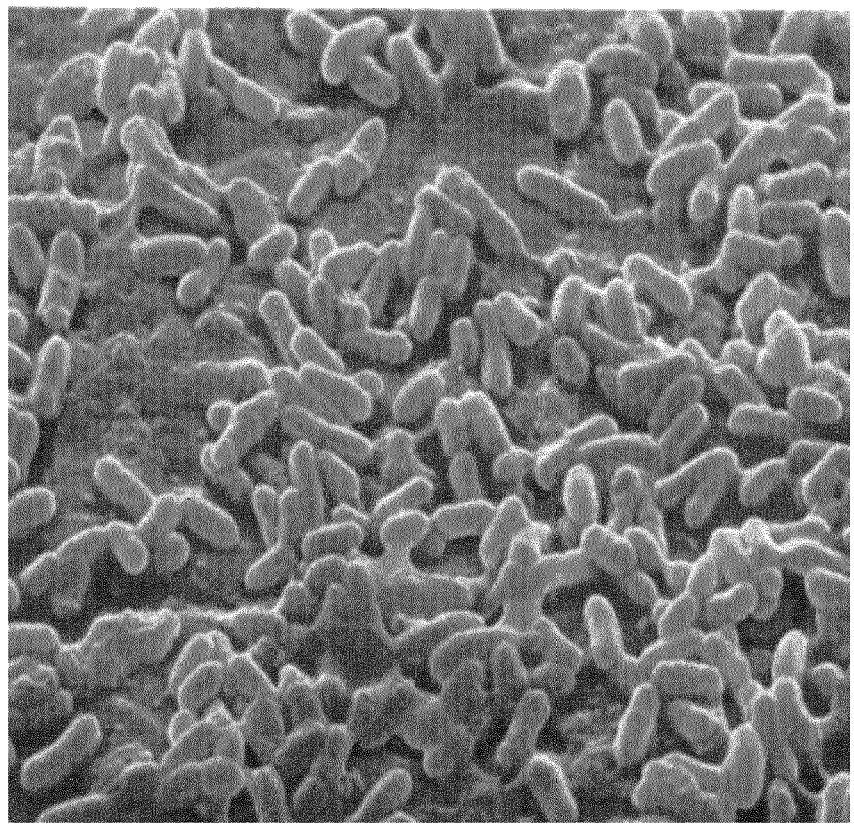
FIG. 19 is a photograph performed on a scanning electron microscope illustrating the ability of the present invention to remove bacterial cells from the surface of a chicken carcass.
Figure 19:
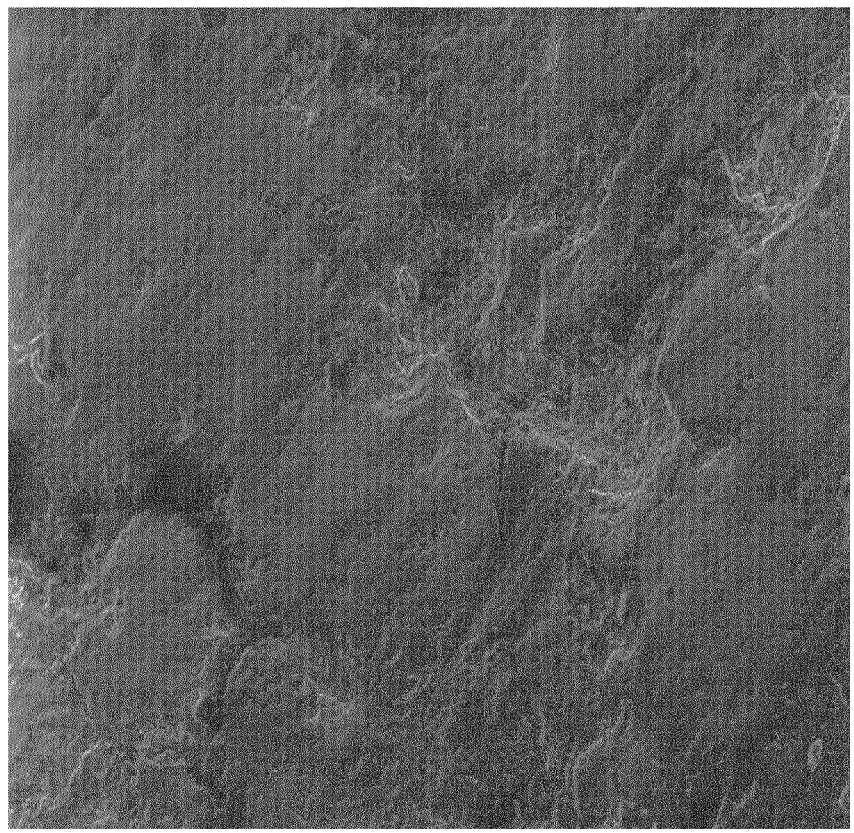

Embodiments of the present invention will now be described by way of non-limiting examples.

Example 1

Testing of Fluid of Present Invention for Compliance with Current Potable Water Standards The legal standards in the UK (National Requirements) are those set by the European Union (EU) in the Drinking Water Directive 1998, and aim to maintain the high quality of water already achieved. The standards are strict, include wide safety margins, and address: micro-organisms, chemicals such as nitrate and pesticides, metals such as lead and copper, and the way water looks and tastes. These parameters were tested by an independent accredited laboratory to the legal requirement.

Microbiological

TABLE 1

| Directive requirements | | | |
|---|---|---|---|
| Parameters as per regulation | Concentration or Value maximum) | Units of Measurement | Present Invention |
| Enterococci | 0 | number/100 ml | 0 |
| Escherichia coli (*E. coli*) | 0 | number/100 ml | 0 |

TABLE 2

| National requirements | | | |
|---|---|---|---|
| Parameters as per regulation | Concentration or Value maximum) | Units of Measurement | Point of compliance |
| Coliform bacteria | 0 | number/100 ml | 0 |
| Escherichia coli (*E. coli*) | 0 | number/100 ml | 0 |

Chemical Parameters

TABLE 3

| Directive requirements | | | |
|---|---|---|---|
| Parameters | Concentration or Value maximum) | Units of Measurement | Present Invention |
| Acrylamide | 0.10 | µg/l | Pass |
| Antimony | 5.0 | µgSb/l | Pass |
| Arsenic | 10 | µgAs/l | Pass |
| Benzene | 1.0 | µg/l | Pass |
| Benzo(a)pyrene | 0.010 | µg/l | Pass |
| Boron | 1.0 | mgB/l | Pass |
| Bromate | 10 | µgBrO3/l | Pass |
| Cadmium | 5.0 | µgCd/l | Pass |
| Chromium | 50 | µgCr/l | Pass |
| Copper (ii) | 2.0 | mgCu/l | Pass |
| Cyanide | 50 | µgCN/l | Pass |
| 1,2 dichloroethane | 3.0 | µg/l | Pass |
| Epichlorohydrin | 0.10 | µg/l | Pass |
| Fluoride | 1.5 | mgF/l | Pass |
| Lead (ii) | 25 (up to 25th December 2013) | µgPb/l | Pass |
| | 10 (on and after 25th December 2013) | µgPb/l | Pass |
| Mercury | 1.0 | µgHg/l | Pass |
| Nickel (ii) | 20 | µgNi/l | Pass |
| Nitrate (iii) | 50 | mgNO3/l | Pass |
| Nitrite (iii) | 0.50 | mgNO2/l | Pass |
| | 0.10 | | Pass |
| Pesticides (iv) (v) | | | Pass |
| Aldrin | 0.030 | µg/l | Pass |
| Dieldrin | 0.030 | µg/l | Pass |
| Heptachlor | 0.030 | µg/l | Pass |
| Heptachlor epoxide | 0.030 | µg/l | Pass |
| other pesticides | 0.10 | µg/l | Pass |
| Pesticides: Total (vi) | 0.50 | µg/l | Pass |
| Polycyclic aromatic hydrocarbons (vii) | 0.10 | µg/l | Pass |
| Selenium | 10 | µgSe/l | Pass |

TABLE 4

Sensory parameters

| Parameters | Concentration or Value (maximum unless otherwise stated) | Units of Measurement | Present Invention |
|---|---|---|---|
| Aluminium | 200 | μgAl/l | 110 |
| Colour | 20 | mg/l Pt/Co | 12 |
| Iron | 200 | μgFe/l | 90 |
| Manganese | 50 | μgMn/l | 11 |
| Odour | <1 at 25° C. | Dilution number | 0.1 |
| Sodium | 200 | mgNa/l | 190 |
| Taste | <1 at 25° C. | Dilution number | 0.94 |
| Tetrachloromethane | 3 | μg/l | <1 |
| Turbidity | 4 | NTU | 2 |

TABLE 5

Secondary tests

| Parameters | Specification Concentration or State(maximum) | Units of Measurement | Present Invention |
|---|---|---|---|
| Ammonium | 0.50 | mgNH4/l | 0.12 |
| Chloride | 250 | mgCl/l | 142 |
| Clostridium perfringens | 0 | Number/100 ml | 0 |
| Coliform bacteria | 0 | Number/100 ml | 0 |
| Colony counts | No abnormal change | Number/1 ml at 22° C. | Pass |
|  |  | Number/1 ml at 37° C. | Pass |
| Conductivity | 2500 | μS/cm at 20° C. | 2100 |
| Hydrogen ion | 9.5 (Maximum) | pH value | 7.5 |
|  | 6.5 (minimum) | pH value | 6.5 |
| Sulphate(i) | 250 | mgSO4/l | 120 |
| Total radioactivity | 0.10 | mSv/year | Pass |
| Total organic carbon | No abnormal change | mgC/l | Pass |
| Tritium (for radioactivity) | 100 | Bq/l | ND |
| Turbidity | 1 | NTU | 1.2 |

The parameters in Tables 1-5 show the change in the water over the course of a day of treatment and are used as indicators of a possible problem in the system or in the future processing of water. The results demonstrate that, in laboratory trials, the fluid used in the present invention passes and exceeds all current regulations with respect to meeting current requirements for potable water.

Example 2

Testing of Carcasses for Microbial Infection 100 samples of whole chicken, each chicken ranging in weight from 1.6 to 2.5 kg, and 50 chicken fillets were purchased from three different UK supermarket chains; and were evaluated for the presence of *E. coli, Campylobacter; Listeria, Salmonella, Legionella, Cryptosporidium*, and general yeast and mould counts. Each sample was purchased with a minimum of three days prior to the recommended expiry of shelf life ("best before date"). The samples were all tested within 24 hrs of purchase and were stared at 2° C. prior to being tested.

A random selection of 120 beef samples were selected from a variety of full carcasses and cuts purchased form a local butcher to ensure the quality of the product and all samples of the meat were evaluated using standard plate counts for contamination of the microbial varieties mentioned above.

A random sampling of 45 pork products including whole carcass and various large cuts were also tested for the microbial varieties mentioned above.

The microbiological tests were performed by an independent accredited laboratory according to the following standards:

| | |
|---|---|
| Presumptive Coliforms | SP 035 Based on ISO 4832 (2006) |
| Coagulase + staphylococci | SP 036 Based on ISO 6888-1 (1999) |
| Bacillus cereus | SP 045 Based on ISO 7932 (2004) |
| Aerobic colony count | SP 048 Based on ISO 4833-1: 2013 |
| Salmonella | SP 102 Based on Solus ELISA |
| Moulds | SP 133 Based on ISO 21527-1 (2008) |
| Yeasts | SP 133 Based on ISO 21527-1 (2008) |
| Listeria spp. | SP 142 Based on AES Chemunex ALOA 1 day |
| Thermotolerant Campylobacter | SP 043 Based on ISO 10272-1 (2006) |

During initial studies it was found that the level of contamination on chicken was significantly different ($p<0.05$) among samples. Accordingly, microbiological examinations were performed on control samples, which were divided up and further treated as follows to ensure a uniform level of initial contamination.

Group 1: Control samples were untreated;

Group 2: Control samples dipped in a turbulent bath of water at 10° C.;

Group 3 Treated potable water was sprayed onto the surface of the control samples; and Group 4: Control samples dipped in a turbulent bath of water at 10° C. and treated potable water was sprayed onto the surface of the dipped control samples.

The results shown in the figures are the average of the triplicate of three independent experiments on ten chicken fillets or whole chickens, with upper and lower outliers being excluded.

In all cases these microbes were completely inhibited in chicken using treated potable water dipped as well as sprayed and in combination. Legionella and cryptosporidium were included in this study as there is "chance" that if dirty water is used in the production process or the chicken makes contact with stagnant water, contamination of chicken could occur.

The invention claimed is:

1. A method for cleaning a carcass, the method comprising the sequential steps of:
    (a) providing a fluid source;
    (b) providing a source of ozone to or at the fluid source;
    (c) providing a source of radiation to or at the fluid source;
    (d) providing a source of disinfectant to or at the fluid source; and
    (e) cleaning a carcass with the fluid;
    wherein the fluid source is a potable water source;
    wherein the radiation is ultraviolet radiation;
    wherein the source of disinfectant comprises an electrolyzed water source;
    wherein the fluid source, the source of ozone, the source of radiation, and the source of disinfectant are in fluid communication.

2. The method according to claim 1, wherein the fluid source provides fluid at a rate of 0.2-3.0 $m^3$/hour.

3. The method according to claim 1, wherein the source of ozone comprises an ozone generator further comprising a source of oxygen, wherein the source of oxygen provides oxygen to the ozone generator at a rate of up to 20 L/min.

4. The method according to claim 3, wherein the source of ozone generates up to 8 g/hour of ozone.

5. The method according to claim 1, wherein the source of disinfectant further comprises a water source and means for splitting the water.

6. The method according to claim 5, wherein the water splitting means comprises a palladium plate.

* * * * *